United States Patent [19]
Adachi et al.
[11] Patent Number: 4,593,999
[45] Date of Patent: Jun. 10, 1986

[54] COPYING APPARATUS

[75] Inventors: Hideki Adachi; Masahiro Tomosada, both of Kawasaki; Masayuki Hirose, Yokohama; Masanori Miyata, Mitaka; Yutaka Komiya, Tokyo, all of Japan

[73] Assignee: Canon Kabushiki Kaisha, Tokyo, Japan

[21] Appl. No.: 508,328

[22] Filed: Jun. 27, 1983

[30] Foreign Application Priority Data

| | | | |
|---|---|---|---|
| Jul. 5, 1982 | [JP] | Japan | 57-115526 |
| Aug. 23, 1982 | [JP] | Japan | 57-144759 |
| Aug. 23, 1982 | [JP] | Japan | 57-144760 |

[51] Int. Cl.[4] .................. G03B 27/52
[52] U.S. Cl. .................. 355/55
[58] Field of Search .................. 355/55-57, 355/59, 8; 353/26 A; 350/255; 354/5, 7

[56] References Cited

U.S. PATENT DOCUMENTS

| | | | |
|---|---|---|---|
| 3,941,978 | 3/1976 | Huston et al. | 353/26 A |
| 4,254,371 | 3/1981 | Scholten | 354/5 X |
| 4,332,461 | 6/1982 | Cail et al. | 355/8 X |
| 4,412,737 | 11/1983 | Iwanade et al. | 355/55 |
| 4,448,517 | 5/1984 | Hayashi | 355/56 |

*Primary Examiner*—L. T. Hix
*Assistant Examiner*—Della J. Rutledge
*Attorney, Agent, or Firm*—Fitzpatrick, Cella, Harper & Scinto

[57] ABSTRACT

A copying apparatus comprises an optical lens, drive means for driving the optical lens, and control means for controlling the drive means. The control means changes over the output of the drive means in accordance with the distance of movement of the optical lens.

15 Claims, 10 Drawing Figures

FIG. 4

| SCALE FACTOR (%) | NUMBER OF CLK PULSES FROM HOME POSITION P1 |
|---|---|
| 142 | 0 |
| 141 | 7 |
| 140 | 15 |
| 139 | 23 |
| 102 | 389 |
| 101 | 401 |
| 100 | 413 |
| 99 | 425 |

COPYING APPARATUS

BACKGROUND OF THE INVENTION

1. Field of the Invention

This invention relates to a copying apparatus having a device for controlling the position of a lens.

2. Description of the Prior Art

Generally, in a copying apparatus having the scale factor changing function, it has been necessary to move an optical lens to a predetermined position in accordance with a changed scale factor and therefore, some time has been required before copying is started.

Also, where only one reference position of the lens is provided, the lens is moved at a predetermined velocity when it is moved to a position corresponding to a predetermined scale factor after having been moved from its current position to the reference position, and this has led to the disadvantage that some time is required for the movement of the lens. Also, there has been a problem that if the velocity of movement of the lens is increased to reduce the time required for the movement of the lens, the lens cannot be stopped accurately at a predetermined position due to the inertia of a motor.

SUMMARY OF THE INVENTION

It is an object of the present invention to eliminate the above-noted disadvantages.

It is another object of the present invention to provide a copying apparatus in which the lens system can be moved accurately to a predetermined position by a simple construction.

It is still another object of the present invention to provide a copying apparatus in which the lens system can be quickly moved to the predetermined position.

It is yet still another object of the present invention to provide a copying apparatus in which the lens system can be accurately and quickly moved to the predetermined position.

It is a further object of the present invention to provide a copying apparatus having a highly safe or reliable lens position controlling device.

Other objects of the present invention will become apparent from the following detailed description thereof taken in conjunction with the accompanying drawings.

BRIEF DESCRIPTION OF THE DRAWINGS

FIG. 4 shows an example of the relation between the copying scale factor and the number of clock pulses.

DESCRIPTION OF THE PREFERRED EMBODIMENTS

Some embodiments of the present invention will hereinafter be described by reference to the drawings.

Figure 1:
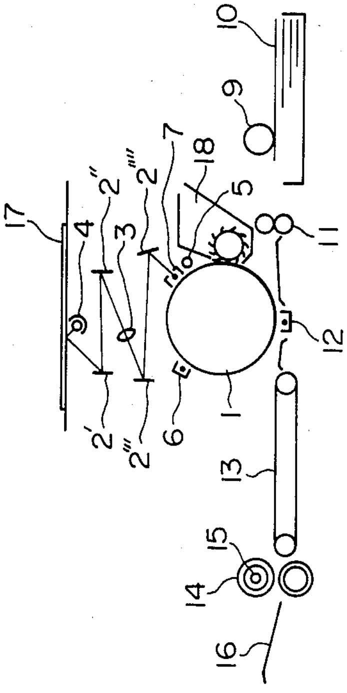
FIG. 1 is a schematic view of a copying apparatus to which the present invention is applicable.

FIG. 1 schematically shows the construction of an electrophotographic copying apparatus to which the present invention is applicable. A drum-shaped rotatable photosensitive medium 1 is uniformly charged by a charger 6, and then is subjected to image exposure and simultaneously therewith, is discharged by a charger 7, and thereafter is subjected to whole surface exposure by a lamp 5. An electrostatic latent image corresponding to the image of an original is formed on the surface of the photosensitive medium 1 by the projection of the image from the surface of the original thereonto. That is, an exposure lamp 4 is fixed on a horizontal plane below a contact glass 17 on which the original rests, and the light from this exposure lamp 4 is reflected by a mirror 2 and projected onto the photosensitive medium 1 through a lens 3. Thus, an electrostatic latent image corresponding to the image of the original is formed on the surface of the photosensitive medium 1. This latent image is then developed into a visible image by a developing unit 18.

Transfer paper 10 is supplied to the photosensitive medium 1 side by a paper feeding roller 9 through register rollers 11, and the developer adhering to the photosensitive medium 1 is transferred to the transfer paper 10 by a transfer charger 12, whereby there is formed a positive image. Thereafter, the transfer paper 10 is separated from the photosensitive medium 1 and conveyed to a fixing device 14 by a conveyor unit 13, whereby the image on the transfer paper 10 is fixed by the fixing device 14, whereafter the transfer paper 10 is discharged onto a tray 16.

Where it is desired to change the scale factor of the copy image, it is necessary that the position of a lens 3 installed in the exposure path be changed along the optical axis thereof and the ratio of the original scanning speed to the velocity of rotation of the photosensitive medium 1 be changed constantly in accordance with the changed scale factor.

The construction and operation of the abovedescribed electrophotographic copying apparatus are well known and therefore need not be described any further.

Of the system for changing the scale factor of the copy image, the lens movement will now be described.

Figure 2:
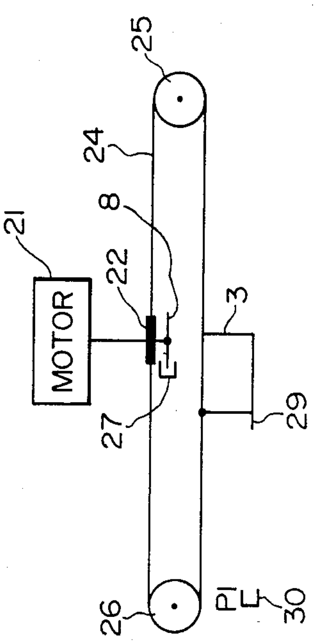
FIG. 2 shows an example of the construction of a mechanism for moving the copying optical lens of the copying apparatus of the present invention.
Figure 3:
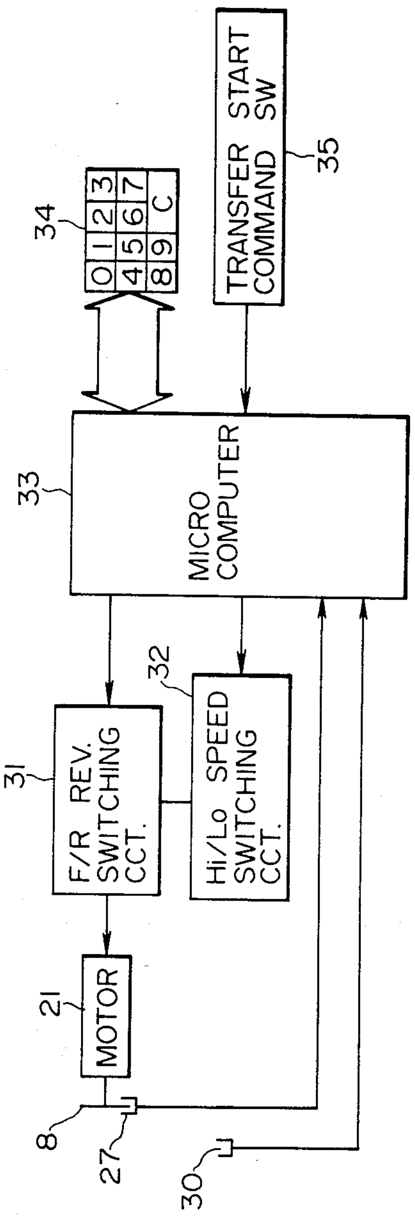
FIG. 3 shows an example of the construction of a control circuit for the moving mechanism of FIG. 2.

An example of the construction of a mechanism for moving the copying optical lens in the copying apparatus of the present invention is shown in FIG. 2, and an example of the construction of a control circuit for the moving mechanism is shown in FIG. 3. In the construction illustrated, the revolution of a DC motor 21 is transmitted through a pulley 22 to a wire 24 extended between pulleys 25 and 26 to rectilinearly move the zoom lens 3 coupled to the wire 24 and, by the rotation resulting from the rectilinear movement of the lens 3, the focal length of the zoom lens 3 is varied to change the copying scale factor. Further, for example, twenty holes are equidistantly formed in the marginal portion of a disc 8 directly connected the rotary shaft of the DC motor 21, and the passage of the holes in the marginal portion is detected by a photointerruper 27 installed in the marginal portion to thereby convert the rotation of the disc 8, namely, the revolution of the DC motor 21, into a pulse train. Also, the zoom lens 3 intercepts a photointerrupter 30 provided at a predetermined reference position P1 by means of a shield plate 29 attached to the zoom lens 3, whereby the arrival of the zoom lens 3 at the reference position (home position) P1 is detected.

The detection pulses of the photointerrupters 27 and 30 are supplied to a controlling micro computer 33 and the data of a copying scale factor specified by a ten-key 34 on an operating portion, not shown, is also supplied to the micro computer 33. In accordance with lens movement starting command from a switch 35, a motor forward-reverse revolution switching circuit 31 and a motor high-low speed switching circuit 32 are controlled by the micro computer 33 to drive the DC motor 21, whereby the zoom lens 3 is moved to a position corresponding to the specified scale factor at a velocity corresponding to the movement distance thereof and a stopped thereat.

The relation between the copying scale factor set in the above-described manner and the number of clock pulses generated by the holes in the marginal portion of the disc 8 and the photointerrupter 27, namely, the relation between the reference position P1 at each specified scale factor and the number of clock pulses, is set as shown, for example, in FIG. 4.

Figure 5:
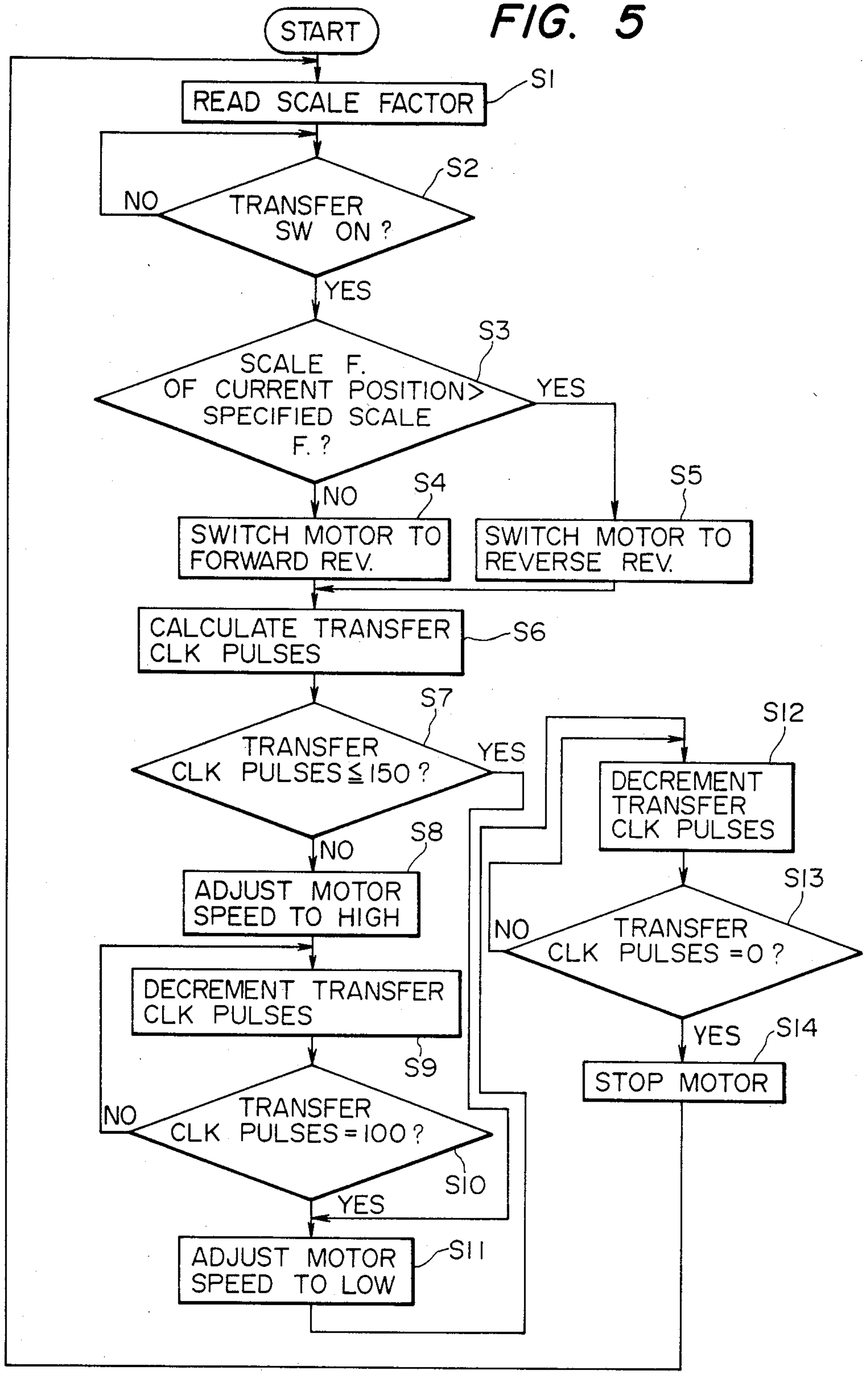
FIG. 5 is a control flow chart for the control of the movement of an optical lens.
Figure 10:
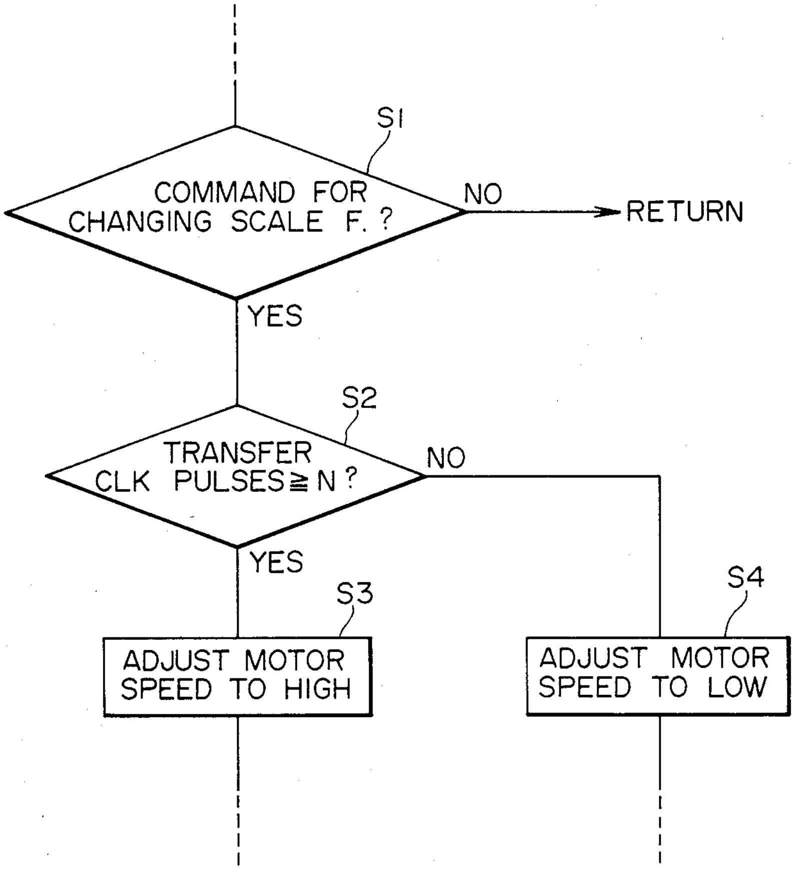
FIG. 10 is a control flow chart when there is a command for changing scale factor.

The control of the movement of the copying optical lens in the copying apparatus of the present invention will now be described by reference to the flow chart of FIG. 5. The program of the flow chart shown in FIG. 5 is stored in the ROM of the one-chip micro computer 33. It is to be understood that the program of the flow chart used in second and third embodiments and shown in FIG. 10 is stored in said ROM.

Describing the operation, at step S1, the data of a copying scale factor specified by the ten-key 34 is read, and then, at step S2, whether or not a lens movement starting command switch 35 has been depressed is repetitively discriminated and, when the switch 35 has been depressed, a scale factor corresponding to the current position of the zoom lens 3 is compared with the specified scale factor at step S3 and, when the former is greater than the latter, the direction of revolution of the motor 21 set by the switching circuit 31 is reversed at step S5, or when the former is smaller than the latter, the direction of revolution of the motor 21 is switched to the forward revolution at step 4. The current position and the position corresponding to the specified scale factor can be converted into the number of clock pulses from the home position, for example, and stored in the RAM. Subsequently, at step S6, on the basis of the relation shown in FIG. 4, the number of clock pulses corresponding to the distance of movement of the zoom lens 3 is calculated from the difference between the number of clock pulses corresponding to the current position and the number of clock pulses corresponding to the specified scale factor. Then, at step S7, it is discriminated and if the number of transfer clock pulses is 150 or less, the high-low speed switching circuit 32 is switched to the low speed at step 11 to revolve the motor 21 at low speed. With the revolution of the motor 21, namely, the rotation of the disc 8, the number of transfer clock pulses is gradually decreased at step 12 and it is discriminated at step 13, and the decrease is continued until the number of transfer clock pulses becomes zero, and the motor 21 is stopped at step 14.

On the other hand, if the number of transfer clock pulses is found to be 150 or more at step S7, the motor 21 is revolved at the high speed at step S8. With revolution of the motor, the number of transfer clock pulses is gradually decreased at step S9 and it is repetitively discriminated at step S10 and when the number of transfer clock pulses has been decreased to 100, the program shifts to step S11 and the motor is adjusted to low speed revolution. When the main switch is closed, it is preferable that the zoom lens 3 be once moved to the home position, whereafter it be moved to one-to-one scale factor position by the above-described process.

In the construction shown in FIG. 3, the lens movement starting command switch 35 may be replaced by a copy button and the scale factor ten-key 34 may serve also as a copy number ten-key. This also holds true of second and third embodiments which will be described later. When movement of the zoom lens 3 has been effected a predetermined number of times to suppress accumulation of error, positioning of the zoom lens from the reference position may be newly effected to thereby improve the positional accuracy. In this case, the predetermined times can be stored in the RAM.

Thus, in the present embodiment, when the distance between the current lens position and the lens position corresponding to the designated scale factor is great, the motor 21 is revolved at high speed and when the lens 3 has come close to the lens position corresponding to the designated scale factor, the motor 21 is changed over the low speed revolution and therefore, movement of the lens can be accomplished in a short time and the influence of the inertia of the motor can be prevented and thus, the lens can be accurately moved to an exact position.

Although the present embodiment is designed such that the velocity of movement of the zoom lens is changed over to two stages, design may also be made such that the velocity of movement of the zoom lens is changed over to a plurality of stages (e.g. three stages) as the lens comes close to the position corresponding to the designated scale factor. Also, design may be made such that when the velocity of movement of the zoom lens is changed over from a first velocity to a second velocity, the change-over occurs gradually from the first velocity to the second velocity. By this, movement (velocity change) of the lens becomes smooth and the influence such as vibration imparted to the apparatus can be reduced.

As will be apparent from the foregoing description, according to the present invention, movement of the copying optical lens in the copying apparatus to the position corresponding to the copying scale factor can be controlled by a simple construction and positioning of the lens can be accomplished with sufficient accuracy and moreover, the time required for the movement can be shortened. The present invention is particularly effective for an apparatus having a continuous scale factor changing mechanism.

Figure 6:
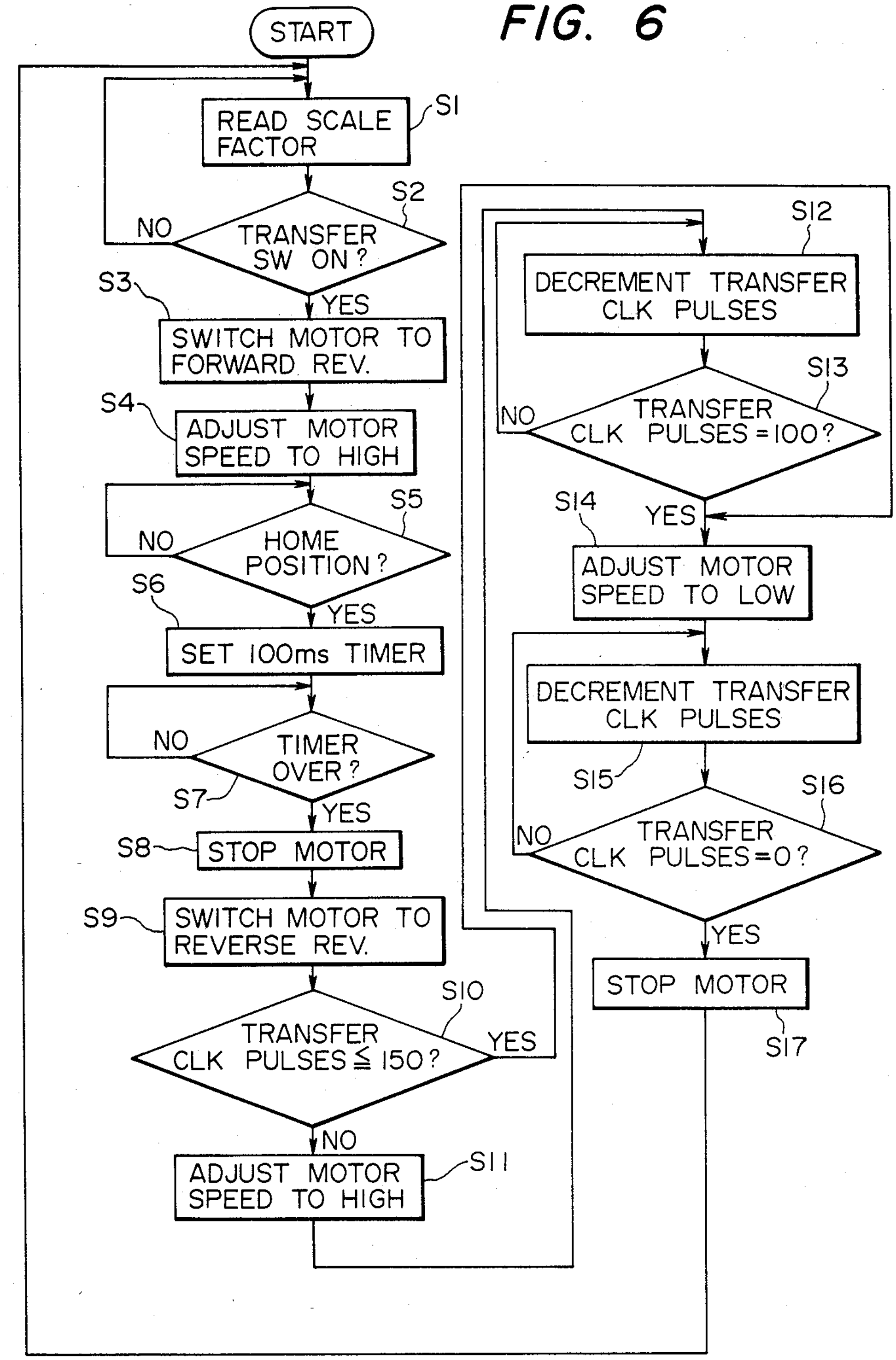
FIG. 6 is a control flow chart for the control of the movement of an optical lens in a second embodiment.

A second embodiment will now be described by the use of the flow chart of FIG. 6. The construction of the second embodiment is the same as that shown in FIGS. 2–4 and therefore need not be described.

First, at step S1, the data of a copying scale factor designated by the ten-key 34 is read and then, at step S2, whether or not the lens movement starting command switch 35 has been depressed is repetitively discriminated. When the switch 35 has been depressed, the program proceeds to step S3 and the forward-reverse revolution switching circuit 31 is switched to the forward revolution and, at the next step S4, the high-low speed switching circuit 32 is switched to the high speed side.

The program then proceeds to step S5, at which, whether or not the zoom lens 3 has come to the reference position (home position) P1 is judged by the sensor 30. When the home position is detected, the program proceeds to the next step S6, at which a 100 mS timer softly constructed in the micro computer 33 is set. The 100 mS time count of this timer is for reliably returning the zoom lens 3 to the home position after the zoom lens 3 is detected by the sensor 30. Whether or not such time count has been effected is judged at step S7 and, upon completion of this 100 mS time count, the program proceeds to step S8 to stop the motor 21. Then, at step S9, the direction of revolution of the motor 21 is switched to the reverse revolution by the forward-reverse revolution switching circuit 31.

Subsequently, the program proceeds to step S10 and if the number of transfer clock pulses from the reference position corresponding to the designated scale factor is 150 or less, the program proceeds to step S14 to revolve the motor 21 at low speed. With the revolution of the motor 21, i.e., the disc 8, the number of transfer clock pulses is gradually decreased at step S15. The number of transfer clock pulses is discriminated at step S16 and the decrease is continued until the number of transfer clock pulses becomes zero, and at step S17, the motor 21 is stopped.

On the other hand, when, at step S10, it is judged that the number of transfer clock pulses is 150 or more, the program proceeds to step S11 to revolve the motor 21 at high speed. With the revolution of the motor 21, the number of transfer clock pulses is gradually decreased at step S12. The number of transfer clock pulses is repetitively discriminated at step S13. When, at step S13, the number of transfer clock pulses has been gradually decreased to 100, the program shifts to the above-mentioned step S14 to adjust the motor 21 to low speed revolution.

When the main switch is closed, the zoom lens 3 may once be moved to the home position, and thereafter may be moved to the one-to-one scale factor reference position by the above-described process.

Thus, in the present embodiment, when it is desired to move the lens 3 to the position corresponding to the designated scale factor, the lens 3 is once returned to the home position and then the lens is moved, and this always ensures accurate control of the lens position. Also, as previously described, the velocity of movement of the lens is changed over in accordance with the distance of movement of the lens and therefore, accurate control of the lens position in a short time can be accomplished.

Since, in the present embodiment, positioning of the lens is effected after the lens is once returned to the home position, the current position need not be specially stored.

Also, design may be made such that when it is desired to return the lens to the reference position, the velocity of movement of the lens is changed over at a point of time whereat the lens has arrived at a certain distance from the reference position. Also, the velocity of movement of the lens may be gradually decreased as the lens comes close to the home position. By this, the shock to the home position of the lens can be minimized.

As will be apparent from the foregoing description, according to the present invention, the movement of the copying optical lens in the copying apparatus to the position corresponding to the copying scale factor can be controlled by a simple construction and positioning of the lens can be accomplished with sufficient accuracy and in a short time.

A third embodiment of the present invention will now be described by reference to FIGS. 7 to 9.

Figure 7:
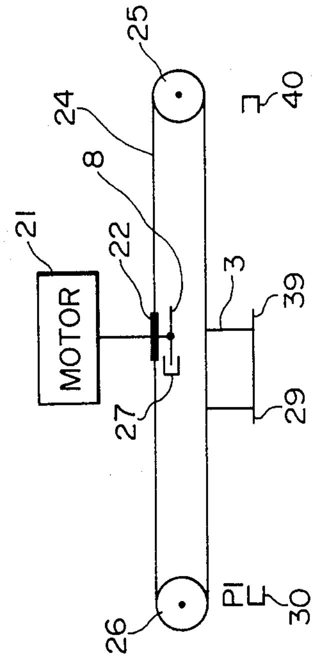
FIG. 7 shows an example of the construction of a mechanism for moving an optical lens in a third embodiment.
Figure 8:
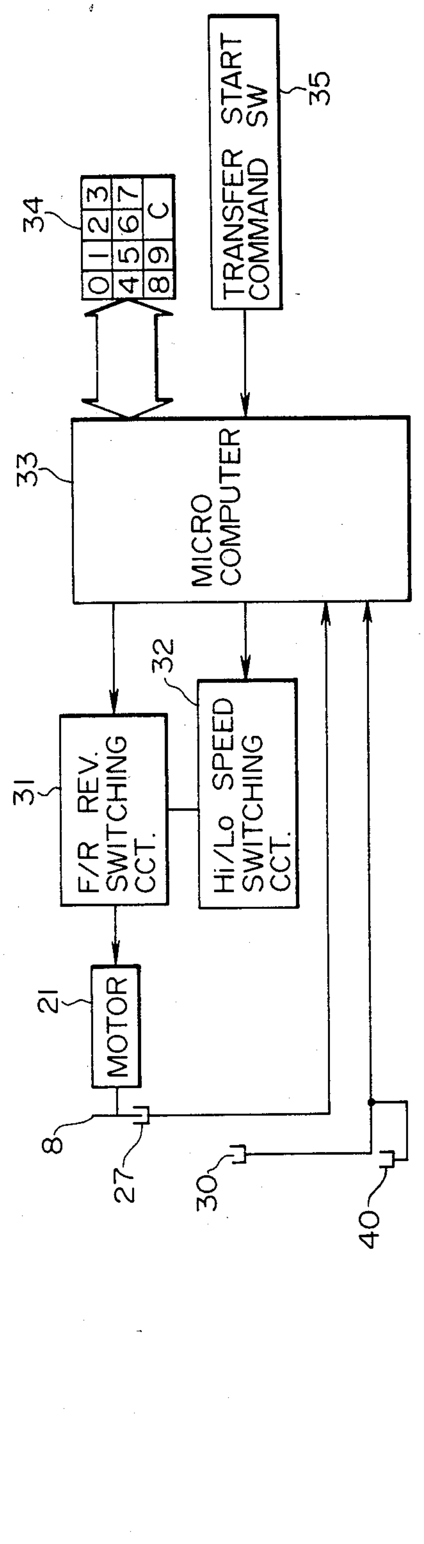
FIG. 8 shows an example of the construction of a control circuit for the moving mechanism of FIG. 7.
Figure 9:
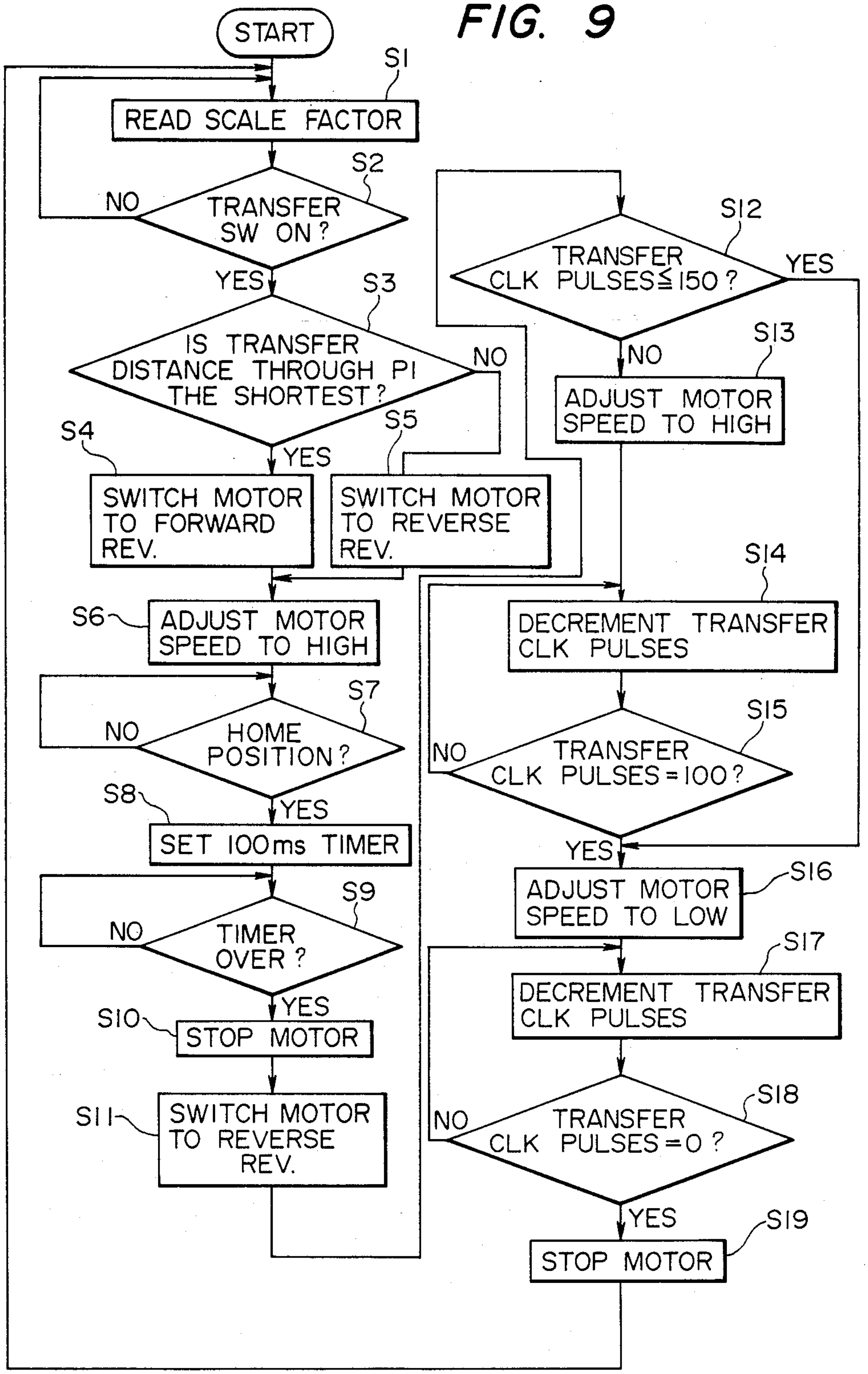
FIG. 9 is a control flow chart in the third embodiment.

FIG. 7 shows an example of the construction of a copying optical lens moving mechanism in the third embodiment, and an example of the construction of a control circuit for the moving mechanism is shown in FIG. 8. In these Figures, members functionally similar to those in FIGS. 2 and 3 are given similar reference numerals. Only the differences between the third embodiment and the embodiment of FIGS. 2 and 3 will hereinafter be described.

The zoom lens 3 has two shield plates 29 and 39 attached thereto, and by the shield plate 29 intercepting a photointerrupter 30, the arrival of the zoom lens at a first reference position 30 is detected. Also, by the shield plate 39 intercepting a photointerrupter 40, the arrival of the zoom lens 3 at a second reference position 40 is detected.

The detection pulses of the photointerrupters 27, 30 and 40 are supplied to a control micro computer 33.

The relation between the first reference position P1 at each designated scale factor and the number of clock pulses is similar to that in the other embodiments and is such as shown, for example, in FIG. 4.

The third embodiment will now be described in detail by the use of the flow chart of FIG. 9.

First, at step S1, the data of a copying scale factor specified by the ten-key 34 is read and then, at step S2, whether or not the lens movement starting command switch 35 has been depressed is repetitively discriminated. When the switch 35 has been depressed, the program proceeds to step S3, at which a reference position which provides the shortest distance for the zoom lens 3 to be moved from the current position to the position corresponding to the designated scale factor through the reference position is judged from the number of transfer clock pulses of the current position. The current position can be pre-stored in the form of clock number in the RAM. When such reference position is the first reference position 30, the program proceeds to step S4 to switch the direction of revolution of the motor 21 to forward revolution and conversely, when such reference position is the second reference position 40, the program proceeds to step S5 to switch the direction of revolution of the motor 21 to reverse revolution.

At the next step S6, the high-low speed switching circuit 32 is changed over to the high speed side. Then, the program proceeds to step S7, at which the arrival of the zoom lens 3 at the first or the second reference position is detected by the sensor 30 or 40. When the arrival of the zoom lens at the reference position is thus detected, the program proceeds to the next step S8, at which a 100 mS timer softly constructed in the micro computer 33 is set. The 100 mS time count of this timer is for reliably returning the zoom lens 3 to the first or the second reference position after the zoom lens 3 is detected by the sensor 30 or 40. Whether or not such time count has been effected is judged at the next step S9 and, upon completion of this 100 mS time count, the program proceeds to step S10 to stop the motor 21. Subsequently, at step S11, the direction of revolution of the motor 21 is switched to reverse direction.

The program then proceeds to step S12 and, if the number of transfer clock pulses from each reference position corresponding to the designated scale factor is 150 or less, the program proceeds to step S16 to revolve the motor 21 at low speed. With the revolution of the motor 21, the number of transfer clock pulses is gradually decreased at step S17. The number of transfer clock pulses is discriminated at step S18 and the decrease is continued until the number of transfer clock pulses becomes zero, and at step S19, the motor 21 is stopped.

On the other hand, when, at step S12, it is judged that the number of transfer clock pulses is 150 or more, the program proceeds to step S13 to revolve the motor 21 at high speed and, with the revolution thereof, the number of transfer clock pulses is gradually decreased at step S14. The number of transfer clock pulses is repetitively discriminated at step S15. When the number of transfer clock pulses has been gradually decreased to 100 at such step S15, the program shifts to the aforementioned step S16 to adjust the motor 21 to low speed revolution.

When the main switch is closed, the zoom lens 3 may once be moved to the reference position (home position), and then may be moved to the one-to-one scale factor reference position by the above-described process. Also, the reference position may be provided at another location, for example, the one-to-one scale factor position. By this, the time required for movement of the lens can be further shortened.

Thus, in the present embodiment, the reference positions are provided at a plurality of locations and therefore, when the lens is to be moved, the shortest distance of movement can be selected. Accordingly, the lens can be moved to a desired position in a short time. Further, the velocity of movement of the lens is changed over in accordance with the distance of movement thereof and therefore, accuract control of the lens position in a short time can be accomplished.

As will be apparent from the foregoing description, according to the present invention, the movement of the copying optical lens in the copying apparatus to the reference position corresponding to the copying scale factor can be controlled by a simple construction without increasing the number of position sensors as in the prior art and positioning of the lens can be accomplished with sufficient accuracy and moreover, the time required for the movement of the lens can be shortened.

In the present embodiment, the high-low speed switching circuit 32 can be designed to change over the voltage applied to the DC motor 21 by the output of the micro computer 33. Also, if the DC motor 21 is a PLL-controlled one, it can be designed such that the reference oscillation frequency is changed over. These are also applicable to the aforementioned change-over of the speed to a plurality of stages. Also, when the velocity of movement of the lens is to be gradually changed over from a first velocity to a second velocity, the voltage applied to the DC motor 21 can be gradually changed over.

The forward-reverse revolution switching circuit 31 can be designed to change over the direction of the current flowing to the DC motor 21 by the output of the micro computer 33.

In the present embodiment, the number of revolutions of the DC motor 21 is converted into a pulse train and position control of the lens 3 is accomplished by counting the number of these pulses, whereas the present invention is not restricted to such method but position control of the lens 3 may also be accomplished by a stepping motor, for example.

Where a stepping motor is employed, the amount of movement of the lens 3 is determined by the number of pulses applied to the stepping motor. Accordingly, by applying to the stepping motor a number of pulses corresponding to the distance over which the lens is then moved, the lens 3 can be caused to arrive at a position corresponding to a desired scale factor. Where the stepping motor is used, the pulses from an encoder need not be counted and thus, control becomes simple. When the distance over which the lens is moved is so long that the motor need be revolved at high speed, the frequency of the pulses applied to the stepping motor can be made high. When the lens 3 has come close to the lens position corresponding to the designated scale factor, if the frequency of the pulses is reduced and the motor is adjusted to low speed revolution, there will be obtained an effect similar to what has been described previously.

When there is a command for changing scale factor during movement of the lens, the velocity of movement of the lens may be changed over in accordance with the then position of the lens and the position corresponding to the changed scale factor. Assume, for example, that the current lens position is near the position corresponding to the scale factor designated at first and that the motor is revolving at low speed. When there is a command for changing scale factor at this time and the lens must be again moved by a long distance, the motor is switched to high speed revolution. The flow chart in such case is shown in FIG. 10.

Whether or not there is a command for changing scale factor is judged at step S1. When there is no such command, the control being presently effected is continued. When there is such a command, the distance between the current position and the position corresponding to the changed scale factor (the number of clocks) is calculated at step S2 and, when said distance exceeds a predetermined distance, the motor is revolved at high speed at step S2. When said distance is less than the predetermined distance, the motor is revolved at low speed at step S4. Where it is necessary to switch the direction of revolution of the motor at step S2, the switching can be effected at step S3 or S5.

Thus, even if there is a command for changing scale factor during movement of the lens, the lens can be quickly and accurately moved to the position corresponding to the changed scale factor.

The present invention is not restricted to the above-described embodiments, but various modifications may be made therein within the scope of the invention as defined in the appended claims.

What we claim is:

1. A copying apparatus comprising:

an optical lens adapted to form images of varying magnification;

detector means for detecting the reference position of said optical lens;

drive means for driving said optical lens; and control means for controlling said drive means;

wherein said control means is adapted to drive said optical lens in each of first and second speed modes, said optical lens being driven at higher speed in said first speed mode than that in said second speed mode, wherein said control means is adapted to move said optical lens to a position corresponding to a desired magnification factor after completion of movement of said optical lens to said reference position by utilizing said first speed mode, and wherein, upon movement of said optical lens from said reference position to the position corresponding to said desired magnification, said control means utilizes said first and second speed modes if the movement distance of said optical lens is more than a predetermined distance and said control means utilizes only said second speed mode if the movement distance of said optical lens is less than the predetermined distance.

2. A copying apparatus according to claim 1, wherein said detector means are provided at a plurality of locations.

3. A copying apparatus according to claim 1, further comprising designating means for designating magnification factor and wherein said control means determines the distance of movement of said optical lens from the reference position thereof in accordance with the designated magnification factor.

4. A copying apparatus according to claim 3, wherein said control means changes over the speed mode from said first speed mode to said second speed mode when said optical lens arrives at a position of a predetermined distance from a position corresponding to the designate magnification factor.

5. A copying apparatus according to claim 2, further comprising designating means for designating magnification factor and wherein said control means moves said optical lens from the reference position thereof in accordance with the designated magnification factor and also selects any of reference positions at a plurality of locations so that the distance of movement of said optical lens is shortest.

6. A copying apparatus according to claim 1, wherein said drive means has a motor and said control means calculates the distance of movement of said optical lens by counting pulses generated in association with operation of said motor.

7. A copying apparatus according to claim 1, further comprising designating means for designating magnification factor and wherein said control means is adapted to move said optical lens to the position corresponding to the magnification factor designated by said designating means after completion of movement of said optical lens to said reference position in said first speed mode.

8. A copying apparatus according to claim 1, wherein upon turning on a power source of the apparatus, said control means is adapted to move said optical lens to a position corresponding to an equal size factor after completion of movement of said optical legs to said reference position in said first speed mode.

9. A copying apparatus according to claim 1, wherein said control means is adapted to drive said optical lens in the direction of said reference position for a predetermined time period after said detector means detects arrival of said optical lens at said reference position.

10. A copying apparatus comprising:

an optical lens;

detector means provided at a plurality of locations to detect the reference position of said optical lens;

designating means for designating magnification factor;

drive means for driving said optical lens; and control means for controlling said drive means;

said control means moving said optical lens from the reference position thereof in accordance with the designated magnification factor and also selecting any of reference positions at a plurality of locations so that the distance of movement of said optical lens is shortest.

11. A copying apparatus according to claim 10, wherein said control means is adapted to drive said optical lens in each of first and second speed modes, said optical lens being driven at higher speed in said first speed mode than that in said second speed mode, and said control means changes over the speed mode in accordance with the distance of movement of said optical lens.

12. A copying apparatus according to claim 11, wherein said control means changes over the speed mode from said first speed mode to said second speed mode when said optical lens arrives at a position of a predetermined distance from a position corresponding to the designated magnification factor.

13. A copying apparatus according to claim 10, wherein said drive means has a motor and said control means calculates the distance of movement of said optical lens by counting pulses generated in association with operation of said motor.

14. A copying apparatus according to claim 10, wherein said control means is adapted to drive said optical lens in the direction of said reference position for a predetermined time period after said detector means detects arrival of said optical lens at said reference position.

15. A copying apparatus according to claim 11, wherein upon turning on power source of the apparatus, said control means is adapted to move said optical lens to the position corresponding to a predetermined magnification factor after completion of movement of said optical lens to the reference position in said first speed mode.

* * * * *

UNITED STATES PATENT AND TRADEMARK OFFICE
CERTIFICATE OF CORRECTION

PATENT NO. : 4,593,999

DATED : June 10, 1986

INVENTOR(S) : HIDEKI ADACHI, ET AL.

It is certified that error appears in the above-identified patent and that said Letters Patent is hereby corrected as shown below:

Column 2, lines 48-49, change "abovede-scribed" to --above-described--.

Column 7, line 37, change "accuract control" to --accurate control--.

Column 9, line 24, change "designate" to --designated--; and line 51, change "legs" to --lens--.

Column 10, line 46, change "on power" to --on a power--.

Signed and Sealed this

Twenty-seventh Day of January, 1987

*Attest:*

DONALD J. QUIGG

*Attesting Officer* *Commissioner of Patents and Trademarks*